(12) United States Patent
Pedrido et al.

(10) Patent No.: US 6,993,937 B2
(45) Date of Patent: Feb. 7, 2006

(54) PREFORM INLET ARRANGEMENT FOR AN OPTICAL FIBER DRAWING FURNACE, A FURNACE PROVIDED WITH THAT KIND OF INLET ARRANGEMENT, AND A PREFORM EQUIPPED TO CO-OPERATE WITH THAT INLET ARRANGEMENT

(75) Inventors: Carlos Pedrido, Boudry Ne (CH); Bernard Leuenberger, Bevaix (CH)

(73) Assignee: Alcatel, Paris (FR)

( * ) Notice: Subject to any disclaimer, the term of this patent is extended or adjusted under 35 U.S.C. 154(b) by 582 days.

(21) Appl. No.: 09/745,414

(22) Filed: Apr. 5, 2001

(65) Prior Publication Data

US 2002/0092328 A1 Jul. 18, 2002

(30) Foreign Application Priority Data

Dec. 17, 1999 (FR) ............................. 99 16526

(51) Int. Cl.
*C03B 37/07* (2006.01)

(52) U.S. Cl. .............................. 65/489; 65/495; 65/537; 65/540

(58) Field of Classification Search .................. 65/489, 65/495, 537, 540, 435
See application file for complete search history.

(56) References Cited

U.S. PATENT DOCUMENTS

| 3,540,870 | A | * | 11/1970 | Li ................................ 118/718 |
| 4,030,901 | A | * | 6/1977 | Kaiser .......................... 264/85 |
| 4,154,592 | A | * | 5/1979 | Bailey ......................... 65/32.5 |
| 4,309,201 | A | * | 1/1982 | Klop et al. ................... 65/32.5 |
| 4,477,274 | A | * | 10/1984 | Janssen et al. ............. 65/374.1 |
| 4,673,427 | A | * | 6/1987 | Van Der Giessen et al. . 65/32.5 |
| 4,988,374 | A | * | 1/1991 | Harding et al. ................ 65/168 |
| 5,713,979 | A | * | 2/1998 | Nicholson et al. ........ 65/374.13 |
| 5,974,838 | A | * | 11/1999 | Uhm et al. .................... 65/379 |
| 6,192,715 | B1 | * | 2/2001 | Orita et al. .................... 65/379 |

FOREIGN PATENT DOCUMENTS

| DE | 39 03 466 A1 | | 8/1990 | |
| DE | 3925961 | * | 2/1991 | .................. 65/537 |

(Continued)

OTHER PUBLICATIONS

European Patent Office abstract of PAJ for publication No. 01028245, 1989, one page.*
European Patent Office abstract of PAJ for publication No. 55020260, 1980, one page.*
European Patent Office abstract of PAJ for publication No. 01009832, 1989, one page.*
European Patent Office abstract of PAJ for publication No. 02145452, 1990, one page.*

*Primary Examiner*—John Hoffmann
(74) *Attorney, Agent, or Firm*—Sughrue Mion, PLLC

(57) ABSTRACT

An inlet arrangement for inserting a preform (3') into a furnace (1') for drawing a fiber (2'). The furnace includes an enclosure (4') at the top of which there are both an opening to allow insertion of a preform which moves in translation, and a preform inlet arrangement (13'). The inlet arrangement comprises both an injector (6') situated at the level of the opening to inject inert gas around the preform and to fill the enclosure, and at least one seal (17B) fixed above the injector and designed to allow the preform to pass therethrough, with its cylindrical main body (9') being surrounded. The inlet arrangement further comprises an airlock (13) for closing and sealing the top of the furnace, above the injector, whether a preform is present or absent, which airlock is pressurized to prevent the surrounding air entering. The rods of the equipped preforms carry respective continuity tubes (20) of the same diameter as the bodies.

15 Claims, 2 Drawing Sheets

FOREIGN PATENT DOCUMENTS

| | | | |
|---|---|---|---|
| DE | 40 06 839 A1 | 9/1991 | |
| EP | 0 803 478 A1 | 10/1997 | |
| EP | 0 849 232 A1 | 6/1998 | |
| GB | 2 044 751 A1 | 10/1980 | |
| GB | 2 305 663 A1 | 4/1997 | |
| JP | 60-81039 | * 5/1985 | ................ 65/435 |
| JP | 60 081 039 A1 | 5/1985 | |
| JP | 61-20493 | * 5/1986 | ................ 65/435 |
| JP | 63-176330 | * 7/1988 | ................ 65/435 |
| JP | 5-147969 | * 6/1993 | ................ 65/435 |
| JP | 6-199536 | * 7/1994 | ................ 65/435 |
| JP | 6-199537 | * 7/1994 | ................ 65/435 |

* cited by examiner

FIG. 1
ART CONNU
FIG. 2
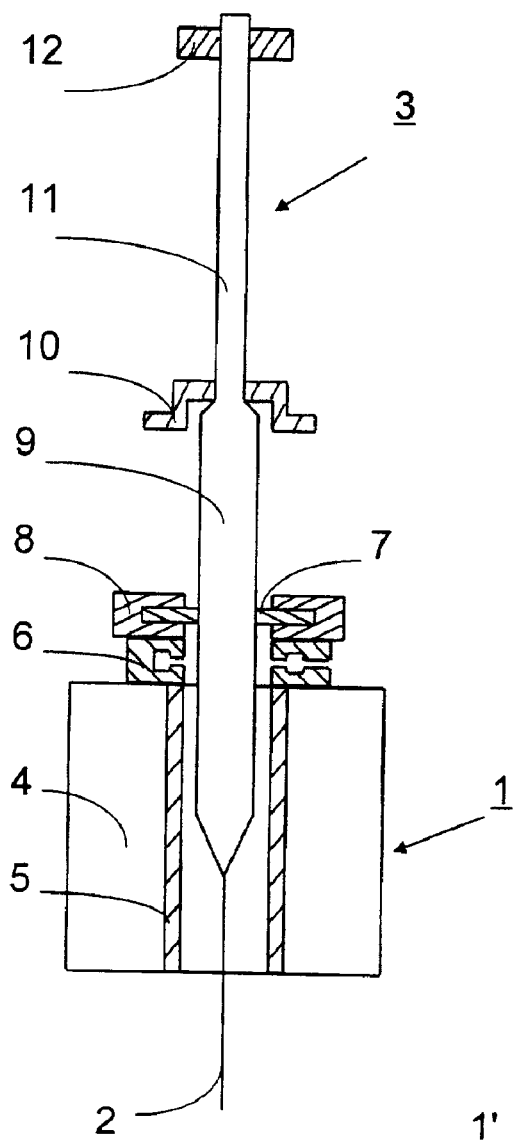
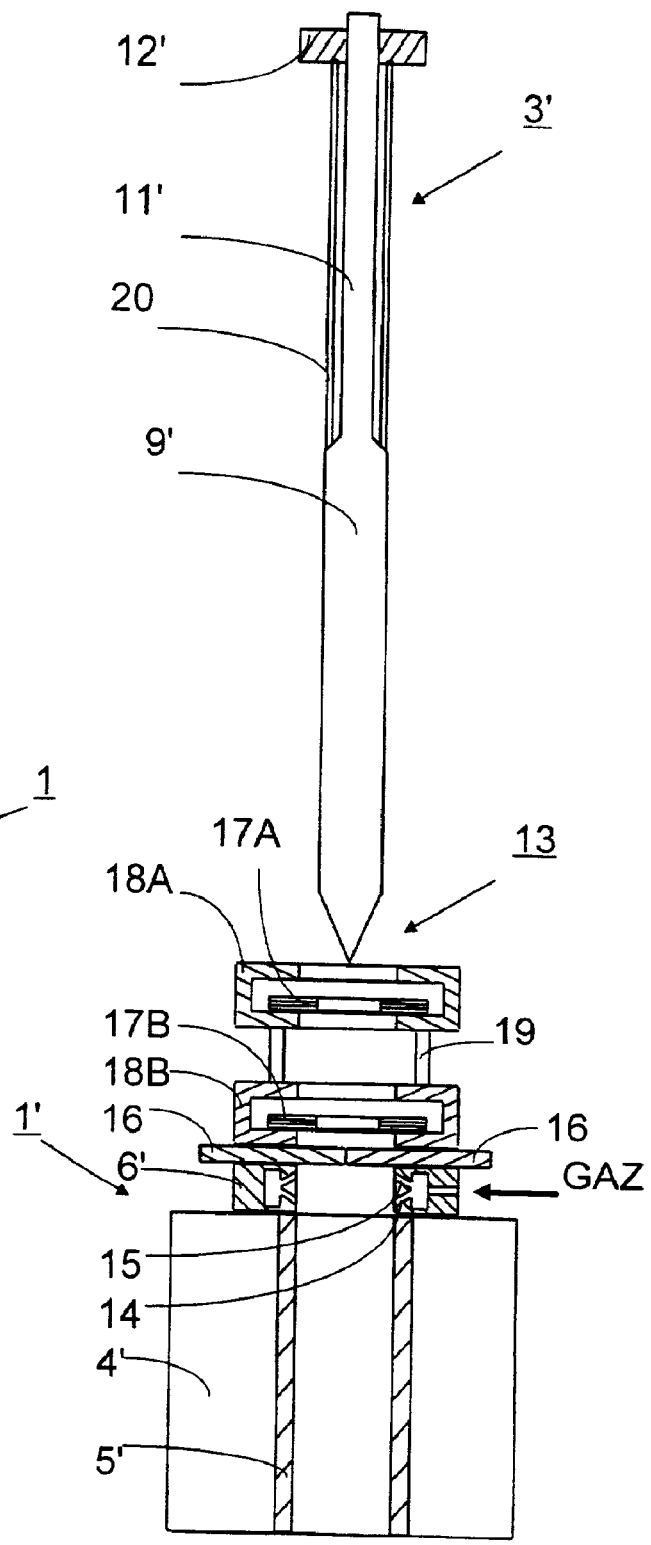

FIG. 3
FIG. 4
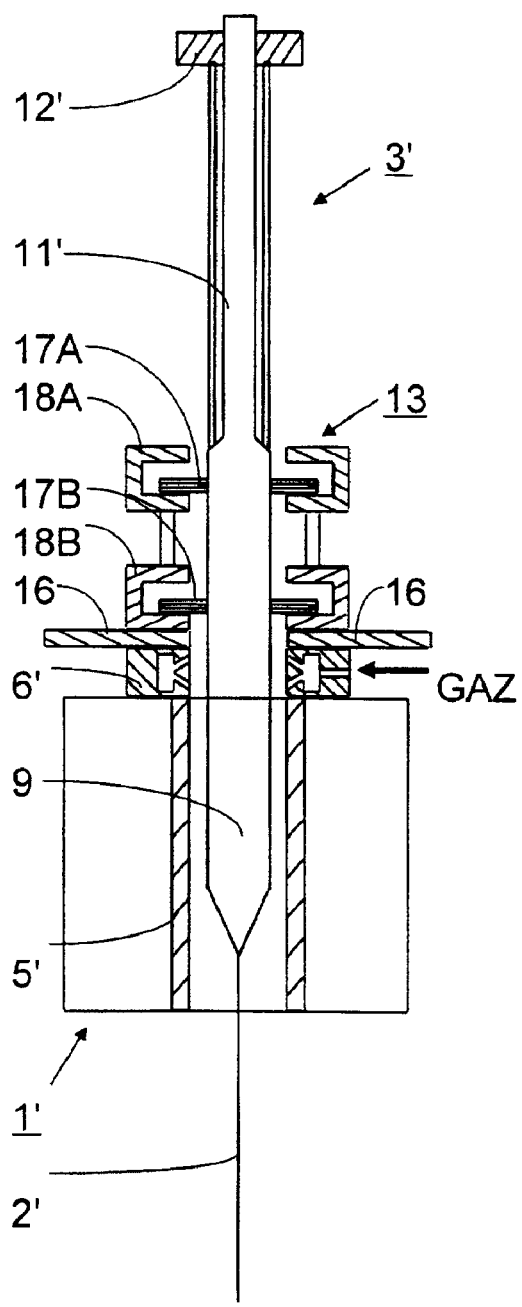
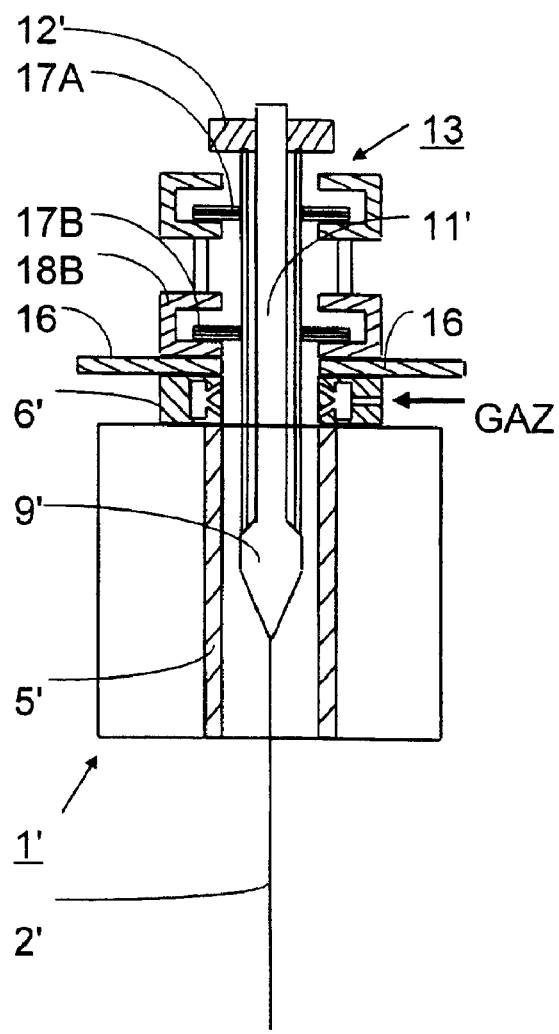

PREFORM INLET ARRANGEMENT FOR AN OPTICAL FIBER DRAWING FURNACE, A FURNACE PROVIDED WITH THAT KIND OF INLET ARRANGEMENT, AND A PREFORM EQUIPPED TO CO-OPERATE WITH THAT INLET ARRANGEMENT

BACKGROUND OF THE INVENTION

The invention relates to a preform inlet arrangement for an optical fiber drawing furnace, to a furnace provided with that kind of arrangement, and to a preform equipped to co-operate with that arrangement.

The production of optical fibers by drawing a heated preform in a furnace necessarily involves phases during which production is stopped for one preform to be replaced by another.

Stopping a drawing furnace to replace a preform so that the preform to be replaced can be extracted and its replacement installed under good conditions is known in the art. The principal drawback of that solution is that it entails stopping the production of fiber for a relatively long time, for example approximately three hours. This is because it is necessary to return the furnace to production conditions, in particular to the production temperature, before resuming drawing. What is more, the furnace is filled with inert gas during the fiber drawing phase and when replacing one fiber with another the surrounding air can infiltrate into the furnace, which in particular can damage graphite elements inside the furnace which are heated to a high temperature while the furnace is in operation.

A drawing furnace preform inlet arrangement which seals the furnace when a preform is present is known in the art. One example of that kind of arrangement is disclosed in particular in the document DE 4 006 839, which describes a rigid seal surrounding the preform at the top of a furnace lid member through which the preform passes and which is adapted internally for injecting an inert gas around the preform inside the furnace. However, that preform inlet arrangement does not solve the problem of preserving the sealing of the furnace when changing the preform.

SUMMARY OF THE INVENTION

The invention therefore proposes an inlet arrangement for inserting a preform into a furnace of the type including an enclosure having at its top both an opening to allow insertion of a preform which moves vertically downwards in translation during fiber drawing, and a preform inlet arrangement. Said arrangement comprises an injector situated at the level of the preform inlet opening to inject inert gas onto the perimeter of the preform to fill the enclosure of the furnace. The arrangement also comprises a seal fixed by means of a seal support above the injector and designed to allow the preform to pass therethrough (with the cylindrical main body of the preform being surrounded by the seal to prevent gas circulating between the surrounding environment and the inside of the furnace at the level where the seal is situated.

According to the invention, the inlet arrangement further comprises an airlock for closing and sealing the top of the furnace, above the injector, whether a preform is present or absent, and for maintaining a positive internal inert gas pressure at the furnace inlet to prevent the surrounding air entering the furnace inlet.

In the invention, the inlet arrangement comprises:

a closure member above the injector (6') to enable the preform body to be lowered into the enclosure of the furnace, when it is open, and to close and seal the top of the furnace above the injector when it is closed, in the absence of preform at its level; and an airlock chamber defined longitudinally by two stages of seals in which the body of a preform can slide in a sealed manner, said chamber fulfilling a furnace airlock function in conjunction with the seals of at least one stage of the closure member as soon as a preform is present at the level of at least one of said stages, which it closes, and the length of the body of the preform is greater than or at least equal to a maximum preform drawing operating limit.

In the invention, the inlet arrangement injector has inert gas injector vents which are oriented towards its airlock in addition to injector vents oriented towards the inside of the furnace.

The invention also proposes a drawing furnace for producing glass fibers which includes an inlet arrangement having at least the feature defined above.

The invention further proposes a preform equipped to co-operate with an arrangement as defined above. The preform is more particularly intended for producing glass fiber in a furnace by drawing one end, referred to as the drawing end, of its cylindrical main body. It is provided with a support member mounted at one end of a rod which extends the body at its upper end, opposite the drawing end, and which has a diameter less than that of the body.

According to the invention, the preform carries a continuity tube which is mounted on the rod between the body and the support member and whose outside diameter corresponds to that of the body, which it extends virtually without discontinuity.

BRIEF DESCRIPTION OF THE DRAWING

The invention, its features and its advantages are explained in the following description, which is given with reference to the figures referred to below.

FIG. 1 is a diagram of an optical fiber drawing furnace into which a preform has been partly inserted through a prior art inlet arrangement.

FIG. 2 is a diagram of an optical fiber drawing furnace including an inlet arrangement of the invention and shows a preform adapted to be used with that kind of arrangement at an insertion position.

FIG. 3 is a diagram of the furnace and the preform shown in FIG. 2 under normal production conditions for drawing fiber.

FIG. 4 is a diagram of the furnace and the preform shown in FIG. 2 under normal production conditions, at the end of processing the preform, before removing it.

DETAILED DESCRIPTION OF THE INVENTION

FIG. 1 shows a standard drawing furnace 1 for producing an optical fiber 2 from a preform 3. The furnace includes an enclosure 4 at the top of which is an opening through which enters a preform 2 which moves downwards in translation during fiber drawing. The bottom of the enclosure 3 of the furnace is also open to enable downward movement of the fiber 2 obtained by drawing the bottom end of the preform 3 with the glass of the preform softened by the heat generated by the furnace.

To draw fiber at the best possible temperature, cylindrical cladding 5, usually made of graphite, is positioned vertically in the furnace between the preform inlet opening and the fiber outlet opening. This is to ensure uniform heating of the part of the preform from which the fiber is extracted and the part of the fiber that has just been extracted from the preform.

The drawing operation is carried out in a controlled atmosphere inside the furnace, into which an inert gas is conventionally injected. In the prior art embodiment shown here, this injection is effected via a cylindrical injector 6 which is positioned on the furnace at the level of the preform inlet opening to inject gas onto the perimeter of the preform and towards the inside of the cladding 5 inside the furnace.

A seal 7, usually made of graphite and therefore rigid, is mounted in a seal support 8 positioned above the injector 6. The preform 3 can pass through it and it surrounds the cylindrical main body 9 of the preform to prevent gas from flowing between the surrounding environment and the inside of the furnace at the level at which it is situated when the drawing end of the preform, from which the fiber is extracted, is inside the furnace.

The cylindrical body 9 of the preform 3 is conventionally extended by a rod 11 which is accommodated under a top cap 10 above the furnace and through which the rod 11 passes. To save material and time in producing the preform, the rod 11 of a preform generally has a diameter smaller than that of the body of the preform, which is possible because it does not constitute a part of the preform from which fiber is extracted. This is known in the art.

A support member 12 is fixed to the end of the rod 11 remote from the body 9. It enables the preform to move relative to the furnace 4 in vertical translation between an inlet position in which the preform is above the furnace and can be inserted in or removed from the furnace, and an extreme position in which at least part of the rod is inside the furnace and which is obtained when the length of the body has been reduced to its minimum value by the drawing operation.

When a preform 3 is inserted into or removed from the furnace 4, there is a period of time during which gases can be exchanged between the inside of the furnace and the surrounding environment via the opening at the center of the seal 7 through which the preform passes.

The invention prevents this by providing an airlock 13 which closes and seals the top of the furnace 3 in the absence of a preform and during preform insertion or removal and preferably maintains positive internal pressure at the furnace inlet to prevent the surrounding air entering, which air is expelled by the injected inert gas.

FIGS. 2, 3 and 4 show an embodiment of a drawing furnace equipped with this kind of airlock, with a vertical preform 3' shown in a different position in each of the figures. The drawing furnace 1' corresponds to the furnace 1 shown in FIG. 1, with an enclosure 4' and cladding 5' corresponding to the enclosure 4 and the cladding 5 of the furnace 1. An injector 6'corresponding to the injector 6 of the furnace 1 is mounted above the enclosure 4' at the level of the preform inlet opening to the enclosure, which it surrounds.

In a preferred embodiment, the injector 6' includes vents 14 and 15 inclined towards the preform and some of which point downwards towards the furnace and others of which point upwards.

A closure member 16 is positioned above the injector 6' and closes and seals the top of the furnace in the absence of a preform. It has two moving closure parts which cover the axial opening for the preform at the center of the injector 6' when they are moved into contact with each other. The opening in the closure member 16 adapted to allow downward movement of a preform into the furnace is formed by moving apart its two moving closure parts. The is effected by moving both parts simultaneously, for example, and employs displacement means of the usual kind; the same applies to moving the moving parts towards each other on closing. The displacement means, which are not shown here, are of the mechanical, electrical, pneumatic or hydraulic type, for example. This is known in the art.

An airlock chamber is provided above the closure member 16 and is defined in the longitudinal direction by two stages of seals 17A and 17B through which the preform body slides when it moves vertically. The seals are stacked cylindrical graphite seals and are held by seal supports 18A and 18B. The seal supports are fastened to a support structure, not shown, of the preform inlet arrangement that they form in conjunction with the seals, the closure member and the injector in this embodiment. The seals 17A, 17B are also cooled, for example by conduction, to prevent premature deterioration. This is known in the art.

The two stages of seals are separated by a distance chosen so that the airlock function provided by the seals 17A and 17B in conjunction with the closure member 16 is always fulfilled, involving the participation of at least one of the stages of seals, as soon as a preform is inserted into the inlet arrangement of which the seals form part and for as long as the length of the preform body is greater than or at least equal to a maximum drawing limit for the preform corresponding to a particular minimum length "lmin". In this embodiment, a connecting sleeve 19 of particular length is placed between the seal supports 18A and 18B. The length of the sleeve depends on the minimum preform body length and therefore in practice on the drawing end cone that remains at the drawing end after the maximum processing of a preform in the drawing furnace.

In an embodiment of the invention that more particularly aims at optimum operation of the inlet arrangement of the invention, with a preform whose rod 11' is conventionally thinner than the body 9', the rod of each preform is sheathed over the length of the rod between the body 9' and the support member 12' by a hollow continuity tube 20 whose outside diameter corresponds to that of the body 9' that it extends, virtually without discontinuity, as can be seen in FIGS. 2 to 4. The tube is made of quartz, for example, and it is threaded over the preform before fixing the retaining part 12'.

Inserting a preform 31 into a furnace entails positioning the preform, preferably equipped with a continuity tube 20, above the airlock 13 of the inlet arrangement 13 of the furnace, as can be seen in FIG. 2. This position is conventionally obtained by fixing the support part 12' of the preform to a vertically movable positioning and support system known in the art and not shown here. A system of this kind is described in the context of a particular fiber production installation in U.S. Pat. No. 4,309,201.

The preform 3' is lowered until it enters the airlock 13 of the furnace inlet arrangement. It can descend through the closure member 16 which closes the passage leading towards the inside of the enclosure 4', as shown in FIG. 2, only if the furnace is already operating and is therefore filled with inert gas and at the fiber drawing temperature.

Lowering the preform 3' causes the cone that constitutes its fiber drawing end to pass through the axial opening of the first stage of seals 17A, on the inside of which the circular cylindrical body 9' of the preform rubs, which closes said axial opening.

It is then possible to open the closure member 16, by moving its two moving parts move away from each other in the embodiment of the closure member described above. The inert gas injected via the vents 15 of the injector fills the airlock. The preform 3' continues to move downwards until its drawing end is at a position inside the cladding 5' such that the fiber drawing operation can be started. Fiber drawing continues as required and leads to the production of a fiber 2' at the drawing end of the preform. In this example, the body 9' is at this time partly accommodated in the axial openings of the two stages of seals 17A and 17B and in the cladding 5', inside which its drawing end is located, as can be seen in FIG. 3. The inert gas is injected via the vents in the injector 6' and entirely towards the inside of the cladding, since the airlock is no longer supplied with gas because of the presence of the preform body in the axial opening of the lower stage seals 17B. The preform 3' is progressively lowered as fiber is produced from the body 9', whose size is decreased by the drawing operation.

In due course the height of the preform body is reduced to such a degree that the top of the body descends to the level of the top stage seals 17A. If the preform is not equipped with a continuity tube, the drawing operation in progress must be stopped before the reduction in size at the level of the junction between the body 9' and the rod 11' enters the axial opening of the lower stage seals 17B to prevent the risk of air penetrating through this opening when it is no longer totally closed off.

However, it is possible to continue the drawing operation further with a preform 9' which is equipped with a continuity tube 20 as described above, since the seals of the upper and lower stages continue to fulfill their function by engaging the continuity tube, whose diameter corresponds to that of the body 9'. This enables a preform 3' equipped in this way to be used until the remaining height of the body 9' reaches the permitted minimum value referred to above. A new preform must then be substituted for the preform which has become unusable.

This entails interrupting the fiber drawing operation and removing the unusable preform from the top. Because it is sealed, the airlock has remained filled with inert gas and the progressive removal of the preform cannot lead to the entry of air when the conical drawing end of the body 9' passes through the lower stage seals 17B, in particular if gas continues to be injected via the injector 6', as is envisaged here. There is therefore no risk of temperature variations due to entry of surrounding air into the furnace when the drawing end cone is removed from the lower stage seals. Because the upper stage seals 17A continue to fulfill their function by co-operating with the continuity tube, and because of the chosen distance between the stages, which is fixed by the length of the sleeve 19, it is possible to close the closure member 16 as soon as the drawing end of the preform 3' has risen above it, at which time the airlock is still sealed from the external environment. It is then possible to continue the removal of the preform from the inlet arrangement with no risk to the furnace once the closure member has been closed.

It must of course be understood that the operations described above do not necessarily require a preform to become unusable before it is removed, and that it is possible to remove a partly-used preform if it is not necessary to continue the drawing operation beyond a given length of fiber.

What is claimed is:

1. An inlet arrangement for inserting a preform into a furnace for drawing a fiber, which furnace is of the type including an enclosure at the top of which there is an opening to allow insertion of the preform which moves vertically downwards in translation during fiber drawing; said inlet arrangement composing both an injector situated at the level of the preform inlet opening to inject inert gas onto the perimeter of the preform to fill the enclosure of the furnace, and an airlock comprising at least one seal fixed by means of a seal support above the injector and designed to allow the preform to pass therethrough with the cylindrical main body of the preform being surrounded to prevent gas circulating between the surrounding environment and the inside of the furnace at the level where the at least one seal is situated; said airlock further comprising a closure member that is selectively operated between a closed position and an open position for closing and sealing the top of the furnace above the injector, and for maintaining a positive internal gas pressure at the furnace inlet to prevent the surrounding entering at that level, and wherein said airlock is disposed above said injector so as to be located upstream of said injector.

2. An inlet arrangement according to claim 1, wherein
said closure member is disposed above the injector to enable the preform body to be lowered into the enclosure of the furnace only when said closure member is open and to close and seal the top of the furnace above the injector when said closure member is closed in the absence of a preform at the level of said closure member; and
wherein said airlock further comprises an airlock chamber defined longitudinally by two stages of seals (17A, 17B) in which the body of a preform can slide in a sealed member, said two stages of seals including said at least one seal forming one stage and a second seal forming the second stage, said chamber fulfilling a furnace airlock function in conjunction with a stage of at least one of the two stages of seals of the closure member as soon as a preform is present at the level of said at least one of said two stages of seals, which it closes, and the length of the body (9') of the preform is greater than or at least equal to a maximum preform drawing operating limit "lmin".

3. An inlet arrangement according to claim 2, wherein the distance between the stages of seals of its airlock is related to a minimum length that corresponds to a maximum preform operating limit "lmin".

4. An inlet arrangement according to claim 1, wherein the injector has inert gas injector vents (15) which point towards its airlock in addition to injector vents (14) which point towards the inside of the furnace.

5. An inlet arrangement according to claim 1, wherein at least one of the stages of seals is made up of stacked graphite seals (17A and/or 17B).

6. An inlet arrangement according to claim 5, wherein the seals are cooled to prevent premature deterioration.

7. A furnace for drawing fiber (2') including an enclosure (4') at the top of which is an opening to allow insertion of a preform, which moves vertically downwards in translation dining fiber drawing, and a preform inlet arrangement (13') above the enclosure and including an injector (6') situated at the level of the preform inlet opening to inject inert gas onto the perimeter of the preform to fill the enclosure of the furnace, and at least one seal (17B) fixed by means of a seal support above the injector and through which the preform passes, whose cylindrical main body (9') it surrounds to prevent circulation of gas between the surrounding environment and the inside of the furnace at its level, characterized in that said furnace includes an inlet arrangement according to claim 1.

8. The inlet arrangement of claim 1, wherein in said closure member is disposed between said at least one seal and said injector.

9. The inlet arrangement of claim 8, wherein said closure member, when in the closed position, closes and seals the top of the furnace so as to isolate the furnace and the injector from said at least one seal.

10. An inter arrangement for inserting a preform into a furnace for drawing fiber, comprising:
   an inlet;
   an outlet downstream of the inlet,
   a first conveying path through the inlet arrangement extending from the inlet to the outlet, the first conveying path for conveying the preform body from and through the inlet to and through the outlet:
   a first seal;
   a closure member located downstream of the inlet and between the first seal and the outlet, the closure member selectively moveable between a closed position that closes and seals the first conveying path and an opened position that opens and unseals the first conveying path; and
   an injector located downstream of the closure member and between the closure member and the outlet, the injector for injecting a gas into the first conveying path of the inlet arrangement.

11. An apparatus for drawing a fiber, comprising:
   a preform body;
   an inlet arrangement, comprising:
      an inlet;
      an outlet downstream of the inlet,
      a first conveying path through the inlet arrangement extending from the inlet to the outlet, the first conveying path for conveying the preform body from and through the inlet to and through the outlet;
      a first seal;
      a closure member located downstream of the inlet and between the first seal and the outlet, the closure member selectively moveable between a closed position that closes and seals the first conveying path and an opened position that opens and unseals the first conveying path; and
      an injector located downstream of the closure member and between the closure member and the outlet, the injector for injecting a gas into the first conveying path of the inlet arrangement; and
   a furnace located downstream of the inlet arrangement and having a second conveying path aligned with the first conveying path for further conveying the preform body through the furnace; and
   wherein the closure member, when in the closed position, seals off the injector and the furnace from the first seal.

12. The apparatus for drawing a fiber according to claim 11, wherein the preform is inserted in the first seal, so that the first seal, together with the preform, seal off from the inlet of the inlet arrangement a first portion of the first conveying path that is downstream of the first seal, so as to substantially prevent gas injected into the first conveying path by the injector from escaping outside the inlet arrangement from the inlet.

13. The apparatus for drawing a fiber according to claim 11, wherein the injector comprises first injector vents that direct gas in an upstream direction of the first conveying path toward the inlet and in a downstream direction of the first conveying path towards the outlet.

14. The apparatus for drawing a fiber according to claim 11, further comprising a second seal disposed between the closure member and the first seal, and wherein the preform is inserted in the second seal, so that the second seal, together with the preform, seal off from the inlet of the inlet arrangement a second portion of the first conveying path that is downstream of the second seal, so as to substantially prevent gas injected into the first conveying path by the injector below the second seal from escaping upstream past the second seal.

15. The apparatus for drawing a fiber according to claim 11, wherein the first seal comprises stacked graphite seals.

* * * * *

UNITED STATES PATENT AND TRADEMARK OFFICE
CERTIFICATE OF CORRECTION

PATENT NO. : 6,993,937 B2
APPLICATION NO. : 09/745414
DATED : February 7, 2006
INVENTOR(S) : Carlos Pedrido and Bernard Leuenberger It is certified that error appears in the above-identified patent and that said Letters Patent is hereby corrected as shown below:

Title Page, item (22) Filed: please delete "Apr. 5, 2001" and insert therefor --December 26, 2000-- item (30) Foreign Application Priority Data
please delete "Dec. 17, 1999" and insert therefor --December 27, 1999--

Signed and Sealed this

First Day of August, 2006

JON W. DUDAS
*Director of the United States Patent and Trademark Office*